United States Patent
Alexander, Jr. et al.

(10) Patent No.: US 6,625,158 B1
(45) Date of Patent: Sep. 23, 2003

(54) METHOD AND SYSTEM FOR ENHANCED COMMUNICATION INVOLVING EMULATED LOCAL AREA NETWORKS

(75) Inventors: Cedell Adam Alexander, Jr., Durham, NC (US); Charles Allen Carriker, Jr., Cary, NC (US); Jim Philip Ervin, Raleigh, NC (US); John Kevin Frick, Raleigh, NC (US); Matthew Blaze Squire, Raleigh, NC (US); Deepak Vig, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 08/903,756

(22) Filed: Jul. 31, 1997

(51) Int. Cl.[7] .............................................. H04L 12/56
(52) U.S. Cl. .................... 370/398; 370/401; 370/395.53
(58) Field of Search ................................ 370/392, 395, 370/396, 401, 402, 398, 404, 352, 353, 397, 395.53; 395/500.44, 200.5; 709/245

(56) References Cited

U.S. PATENT DOCUMENTS

| | | | |
|---|---|---|---|
| 5,251,213 A | | 10/1993 | Videlock et al. ............ 370/403 |
| 5,280,481 A | * | 1/1994 | Chang et al. ................ 370/352 |
| 5,323,388 A | * | 6/1994 | Chang et al. ................ 370/353 |
| 5,327,431 A | | 7/1994 | Heske, III et al. .......... 370/403 |
| 5,577,033 A | * | 11/1996 | Chang et al. ................ 370/402 |
| 5,581,552 A | * | 12/1996 | Civanlar et al. ............. 370/396 |
| 5,600,644 A | * | 2/1997 | Chang et al. ................ 370/404 |
| 5,805,805 A | * | 9/1998 | Civanlar et al. ......... 395/200.5 |
| 5,812,552 A | * | 9/1998 | Arora et al. ................. 370/401 |
| 5,818,842 A | * | 10/1998 | Burwell et al. ............. 370/397 |
| 5,870,589 A | * | 2/1999 | Alexander, Jr. et al. ...................... 395/500.44 |
| 5,905,872 A | * | 5/1999 | DeSimone et al. ......... 709/245 |
| 5,946,311 A | * | 8/1999 | Alexander, Jr. et al. .... 370/395 |

OTHER PUBLICATIONS

IBM TDB, Vo. 37, No. 10, 10/94, pp. 75–80 "Addressing Source Routing in an ATM Emulated LAN".

* cited by examiner

Primary Examiner—Hassan Kizou
Assistant Examiner—John Pezzlo
(74) Attorney, Agent, or Firm—Gerald R. Woods; Felsman, Bradley, Vaden, Gunter & Dillon, LLP

(57) ABSTRACT

Provided are a method and system for achieving enhanced performance in communications between a plurality of emulated networks overlaid onto at least one base network, wherein the communications involve one or more source route bridges. The method and system accomplish their objects via the following. Determining when communication is to occur, through the one or more source route bridges, and between at least two entities where a first of the at least two entities is a member of a first emulated network and where a second of the at least two entities is a member of another of the plurality of emulated networks. Informing the at least one of the at least two entities of one or more addresses consonant with the protocols of the at least one base network wherein the one or more addresses identify one or more base network entities closely correspondent to at least one of the at least two entities. And thereafter utilizing the one or more addresses in communication between the first and second entities such that communications between the first and second entities is established in such a fashion that at least one of the one or more source route bridges is bypassed, thereby ensuring that the processing and delay associated with the at least one bypassed source route bridge is avoided wherein the performance in communications involving the at least two emulated networks is enhanced.

23 Claims, 9 Drawing Sheets

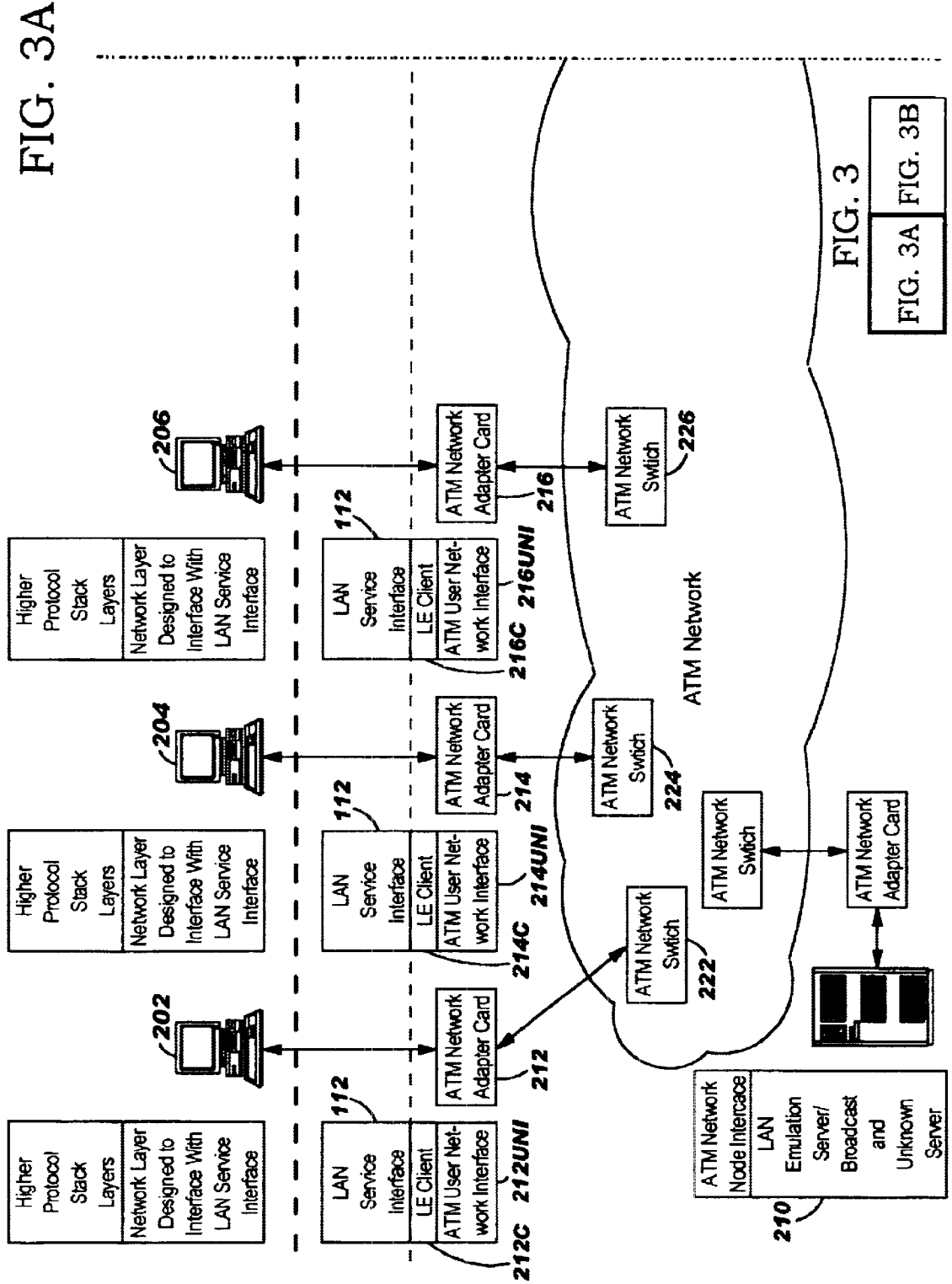

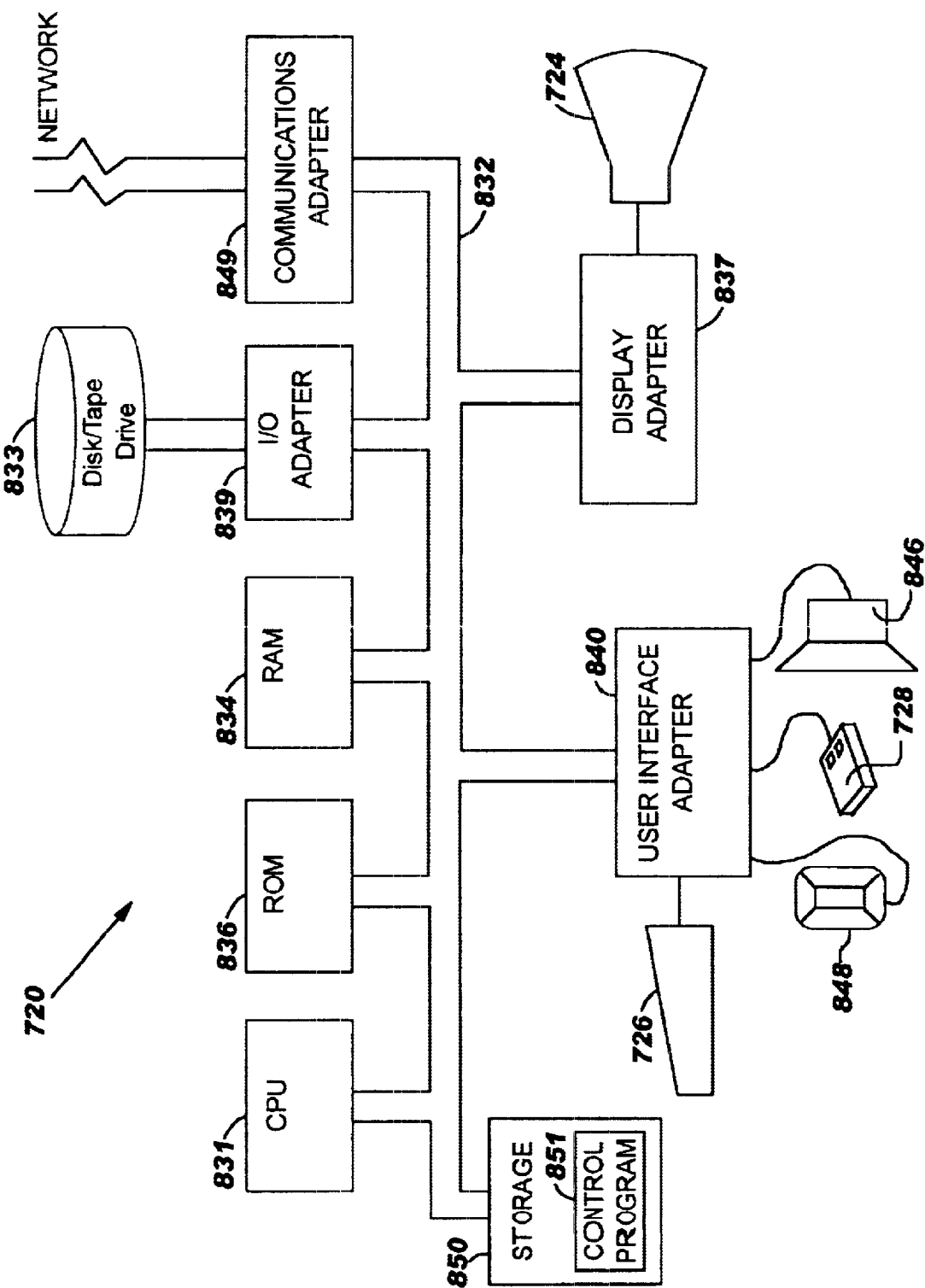

METHOD AND SYSTEM FOR ENHANCED COMMUNICATION INVOLVING EMULATED LOCAL AREA NETWORKS

BACKGROUND OF THE INVENTION

1. Technical Field

The present invention is related to a method and system to be utilized in data communications. In particular, the present invention is related to a method and system to be utilized in data communications involving at least one data communications network. Yet still more particularly, the present invention is related to a method and system, to be utilized in data communications involving at least one data communications network, and wherein said data communications involve multiple emulated data communications networks residing in the at least one data communications network, and which provide enhanced performance in communications involving multiple emulated data communications networks.

2. Description of the Related Art

Data communications is the transfer of data from one or more sources to one or more sinks that is accomplished (a) via one or more data links between the one or more sources and one or more sinks and (b) according to a protocol. Weik, *Communications Standard Dictionary* 203 (3rd ed. 1996). A data link is the means of connecting facilities or equipment at one location to facilities or equipment at another location for the purpose of transmitting and receiving data. Weik, *Communications Standard Dictionary* 206 (3rd ed. 1996). A protocol, in communications, computer, data processing, and control systems, is a set of formal conventions that govern the format and control the interactions between two communicating functional elements in order to achieve efficient and understandable communications. Weik, *Communications Standard Dictionary* 770 (3rd ed. 1996).

A data communications network is the interconnection of three or more communicating entities (i.e., data sources and/or sinks) over one or more data links. Weik, *Communications Standard Dictionary* 618 (3rd ed. 1996).

Data communications networks connect and allow communications between multiple data sources and sinks over one or more data links. The concept of a data link includes the media connecting one or more data sources to one or more data sinks, as well as the data communications equipment utilizing the media. The Data communications networks utilize protocols to control the interactions between data sources and sinks communicating over the one or more data links. Thus, it follows that such protocols must take into account the data communications requirements of data sources and links desiring communication over the one or more data links, and the nature of the underlying one or more data links themselves, in order to ensure that the requirements of such data sources and sinks are met.

Since protocols are interrelated to both the technology of the underlying data links and the data source and sink communications requirements, data communications protocols tend to evolve over time, as both data link technology and data transmission requirements change. A good example of such evolution is the relatively recent emergence of the Asynchronous Transfer Mode (ATM) protocol in order to satisfy data communications network user requirements by the use of fast digital communications equipment.

Today's data communications network users often have widely varying data communications transmission and reception requirements over time. For example, at one point in time a user may desire to transfer computer files over a network, while at another point in time the same user may want to engage in real-time voice communications over the same network, while at yet another point in time the same user may want to transmit and receive high-resolution full motion video over the same network.

These varying user needs have greatly varying requirements as far as the underlying data networks are concerned. For example, real-time traffic such as voice and high resolution video can tolerate some loss but not delay, while non-real-time traffic such as computer data and file transfer may tolerate some delay but not loss. Furthermore, exactly when different types of traffic will occur is not known in advance, but tends to occur at random intervals. In other words, the data comes in bursts and must be transmitted at the peak rate of the burst (which may be quite high as in full motion video), but the average arrival time between bursts may be quite large and randomly distributed.

Asynchronous Transfer Mode (ATM) protocol has evolved in order to satisfy the foregoing and similar data communications requirements by use of emerging digital communications equipment. ATM is a communications protocol that (a) enables the transmission of voice, data, image, and video signals over wide area, high bandwidth communications systems; (b) provides fast packet switching in which information is inserted into small fixed size cells that are multiplexed and switched in a slotted operation, based upon header content, over a virtual circuit established immediately upon request for service; (c) has been chosen as the switching standard for broadband integrated services digital networks (BISDNs); (d) has variable transmission rates; (e) offers bandwidth on demand service, and (f) supports multiple concurrent connections over single communications lines. Weik, *Communications Standard Dictionary* 47 (3rd ed. 1996).

ATM is a type of fast packet switching protocol. A packet, in data communications, is a sequence of binary digits that has one or more of the following characteristics: (a) includes data, control signals, and possibly error control signals, (b) is transmitted and switched as a composite whole, (c) is arranged in a specific format, such as a header part and a data part, (d) may consist of several messages or may be part of a single message, (e) is used in asynchronous switched systems, and (f) is usually dedicated to one user for a session. Weik, *Communications Standard Dictionary* 690 (3rd ed. 1996). A fast packet switching protocol increases the speed of packet switching by eliminating overhead (i.e., information in a packet which is solely utilized for efficient and correct communications and has no information content of interest to the ultimate network user). Weik, *Communications Standard Dictionary* 690 (3rd ed. 1996). Thus, in ATM user data is divided into "chunks" (i.e., is "packetized") and then control information is added to those chunks to make sure that they arrive at the appropriate destination.

In an ATM protocol network fast packet switching protocol overhead is reduced by (1) allocating flow control (making sure that a network node's buffer capacity is not exceeded) and error control (making sure that information is not corrupted) to nodes within the network, and (2) providing different Quality of Service (with lower Quality of Services requiring less overhead) dependent upon requirements received from ATM protocol network users.

The ability of ATM to provide different Quality of Service is one of the greatest advantages of ATM. These different qualities of service allow data communications networks to carry, in an integrated way, both real-time traffic such as voice and high resolution video which can tolerate some loss but not delay, as well as non-real-time traffic such as computer data and file transfer which may tolerate some delay but not loss. Thus, ATM gives networks the ability to efficiently handle the widely variant network user data requirements referenced above.

ATM provides the mechanisms whereby widely varying user data demands may be satisfied without unduly. consuming network communications resources. That is, ATM tends to maximize efficiency of the data communication network wherein it is used. Hence, there is tremendous pressure from the communications industry to move toward ATM protocol networks.

Unfortunately for the communications industry, there exists today a tremendous installed base of non-ATM protocol networks (e.g., Wide Area Networks (WANs), Local Area Networks (LANs), Internet Protocol Networks) which do not utilize ATM protocol. Furthermore, some of the non-ATM protocol networks have features, which ATM protocol networks do not provide but that user systems have come to rely upon and have been designed to utilize. Thus, while the communications industry desires to move toward ATM protocol networks for reasons mentioned previously, a large percentage of the industry's customer base has opposed such movement in that such customer base has previously invested in hardware and software designed for non-ATM protocol networks. Thus, a major problem faced by the industry is how to move toward ATM protocol networks without disturbing its existing installed customer base.

The communications industry has opted for an attrition strategy to solve this problem. Under this strategy, the industry has opted to move toward ATM protocol networks while simultaneously continuing to support the vast installed base of non-ATM protocol networks, and the network and link layer protocols operating on these networks. (The hope being that as new users come on line, they will utilize ATM protocol equipment and that as older systems are phased out, they will be replaced with ATM protocol systems.) The key to this strategy is empowering the ATM protocol networks to be able to support non-ATM protocols, and to be able to supply non-ATM features which users have come to expect and rely upon.

The communications industry has opted to provide such support and supply such features via various "overlay" schemes. While the specifics of any particular overlay implementation are complex, the general idea is relatively straightforward: any non-ATM capability will be provided by a (logically) separate protocol that is (logically) overlaid onto a base ATM protocol network. The (logically) overlaid protocol is then utilized to allow non-ATM protocol networks to interact with ATM protocol networks "as if" the ATM protocol networks, and entities within such ATM protocol networks, recognize the protocols and support the features of non-ATM protocol networks.

One of the more well-known overlay schemes involves emulating the function of one network protocol scheme within the ATM network itself. An example of such is Local Area Network Emulation.

Local Area Network (LAN) Emulating protocol overlay schemes are often utilized to create one or more emulated local area networks within one or more ATM protocol networks. Each emulated network is a logical construct which is maintained by a LAN Emulation Server (the specifics of LAN Emulation Servers will be described below in the detailed description). However, from the standpoint of computing systems utilizing emulated local area networks, such emulation is completely transparent. That is, such emulation allows the use of "off the shelf" applications designed to function with local area network hardware and software, and functions "as if" the emulated network were in fact a true, physical, local area network.

An advantage of the ATM protocol LAN emulation scheme is that it allows standard LAN hardware to be utilized, with minimal modifications, to allow communications between emulated LANs, physical LANs, or combinations of emulated and physical LANs. ATM protocol LAN emulation is able to provide such functions by providing interfaces which allow the use of virtually "off the shelf" physical LAN Source Route Bridges (that is, physical LAN Source Route Bridges that have been minimally modified to interface with ATM protocol LAN emulation) which are used to bridge data between the aforementioned LAN types (i.e., physical or emulated).

Such a scheme has advantages in that it allows the utilization of pre-existing equipment built for physical LANs. However, the scheme also has disadvantages in that it brings with it disadvantages inherent with using physical LAN Source Route Bridges: such LAN Source Route Bridges often serve as bottlenecks for data traffic, irrespective of the type of networks (i.e., physical or emulated). That is, just as such Source Route Bridges can serve as data bottlenecks when connecting two physical networks, the way in which ATM LAN emulation utilizes such Source Route Bridges to achieve inter-emulated LAN communication also gives rise to the same type of data bottlenecks. An example of a situation in which such a data bottleneck arises is that where there is rather continuous data traffic between a station on a first emulated LAN with a station on another emulated LAN. Another example is that where a large number of stations on a first emulated LAN linked by a Source Route Bridge to a second emulated LAN are engaging in communication with stations on the second emulated network across the Source Route Bridge.

Since all inter LAN (emulated or physical) traffic must cross the Source Route Bridge, such traffic often "backs up" at the Source Route Bridge when the inter-network traffic (between either emulated, physical, or a combination of emulated and physical networks) is high. It is apparent alleviation of such data bottleneck problems is desirable. However, as was discussed above, the ATM LAN emulation's use of physical LAN Source Route Bridges still remains desirable since it allows bridging between physical, emulated, and combinations of physical and emulated LANs.

Thus, it is apparent from the foregoing that a need exists for a method and system which retains the flexibility and power of the foregoing noted network emulation overlay schemes, and yet significantly reduces the noted data stream bottleneck problems.

SUMMARY OF THE INVENTION

It is therefore one object of the present invention to provide a method and system to be utilized in data communications.

It is therefore another object of the present invention to provide a method and system to be utilized in data communications involving at least one data communications network.

It is yet still another object of the present invention to provide a method and system, to be utilized in data communications involving at least one data communications network, and wherein said data communications involve multiple emulated data communications networks residing in the at least one data communications network, and which provide enhanced performance in communications involving multiple emulated data communications networks.

The foregoing objects are achieved as is now described. Provided are a method and system for achieving enhanced performance in communications between a plurality of emulated networks overlaid onto at least one base network, wherein the communications involve one or more source route bridges. The method and system accomplish their objects via the following. Determining when communication is to occur, through the one or more source route bridges, and between at least two entities where a first of the at least two entities is a member of a first emulated network and where a second of the at least two entities is a member of another of the plurality of emulated networks. Informing the at least one of the at least two entities of one or more addresses consonant with the protocols of the at least one base network wherein the one or more addresses identify one or more base network entities closely correspondent to at least one of the at least two entities. And thereafter, utilizing the one or more addresses in communication between the first and second entities such that communications between the first and second entities is established in such a fashion that at least one of the one or more source route bridges is bypassed, thereby ensuring that the processing and delay associated with the at least one bypassed source route bridge is avoided wherein the performance in communications involving the at least two emulated networks is enhanced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is an illustration of a representative hardware environment which can be utilized in accordance with the method and system of an illustrative embodiment of the present invention.

DETAILED DESCRIPTION OF ILLUSTRATIVE EMBODIMENT

Figure 1:
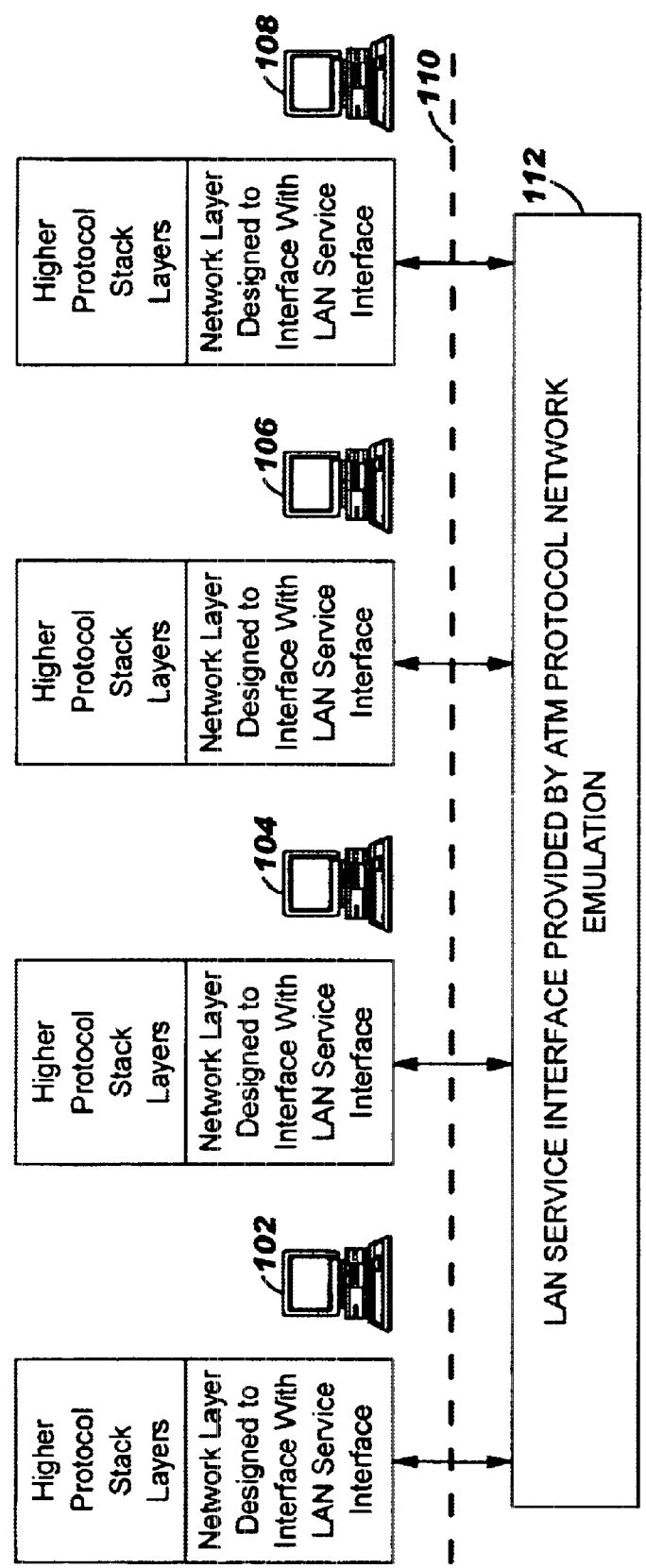
FIG. 1 illustrates how an ATM protocol network running LANE appears from the standpoint of computers forming one Local Area Network.

The following involves discussion of specific ATM protocols known in the art. Those skilled in the art will recognize that any specific discussion of ATM networks necessarily requires use of a number of acronyms and ATM specific concepts. Following, brief descriptions of acronyms utilized will be given. Those requiring more detailed descriptions of the acronyms are referred to the ATM references well known to those within the art.

The following presents a detailed description of an illustrative embodiment of the proposed method and system to be utilized with Local Area Network Emulation systems. Those skilled in the art will recognize that an illustrative embodiment of the present invention will function in any environment wherein a base data communications network is overlaid with any system which makes the base network appear and function as if the base network were in fact running protocols and providing functions different from those which the base network in actuality is running and providing. The following described illustrative embodiments are set forth to illustrate the concepts and principles involved in such functioning.

In the following detailed description, like parts are indicated by like numbers. Furthermore, the first digit of each reference numeral generally relates to the figure wherein the primary description of that reference numeral appears. For example, 1xx would have its primary description in relation to FIG. 1, 2xx in relation to FIG. 2, 3xx in relation to FIG. 3, and so forth.

There are different ways of running network layer protocols across an (overlay mode) ATM network, but one of the most popular is known as LAN Emulation (LANE). The LANE designation applies to a specific protocol by which local area networks are emulated, but those skilled in the art will recognize that LANE is representative of all emulation schemes which "overlay" one protocol scheme (e.g., a Local Area Network protocol) on top of a network running a different protocol scheme (e.g., an ATM protocol).

As the name suggests, the function of the LANE protocol is to emulate a local area network on top of an ATM network. The LANE protocol defines mechanisms for emulating well known LANs such as Ethernet and Token Ring LANs.

What LAN Emulation means is that the LANE protocol defines a service interface for higher layer (that is, network layer) protocols, which is identical to that of existing LANs, and that data sent across the ATM networks are encapsulated in the appropriate LAN MAC (medium access control) packet format. It does not mean that any attempt is made to emulate the actual media access control protocol of the specific LAN concerned (that is, CSMA/CD for Ethernet or token passing for Token Ring LANs).

In other words, the LANE protocols make an ATM network look and behave like an Ethernet or Token Ring LAN.

The rationale for doing this is that it requires no modifications to higher layer protocols to enable their operation over an ATM network. Since the LANE service presents the same service interface of existing MAC protocols to network layer software, no changes are required in such software.

The LANE protocol defines the operation of a single emulated LAN (ELAN). Multiple ELANs may coexist simultaneously on a single ATM network since ATM connections do not "collide." A single ELAN emulates either Ethernet or Token Ring. A single ELAN is composed of a LAN Emulation Server/Broadcast and Unknown Server (LES/BUS), and LAN Emulation Clients (LE Clients) of that LES/BUS.

As has been discussed, LANE allows machines running Local Area Network protocols to interface with and utilize ATM protocol networks via the network layer commands of the Local Area Network protocols. How this is accomplished will be illustrated below.

FIG. 1 illustrates how ATM protocol network LANE appears from the standpoint of computers utilizing such Local Area Network Emulation. It is assumed for sake of illustration that computers 102, 104, 106, and 108 are running some protocol stack with a network layer set up to interface with a standard Local Area Network protocol (such as Token Ring or Ethernet). In a normal, physical, Local Area Network, the network layer of a computer utilizing the Local Area Network communicates with other stations on the Local Area Network by presenting the Local Area Network address or addresses of the computers on the Local Area Network to the service interface provided by the local area network itself. The stations on the local area network are typically identified by Media Access Control (MAC) addresses, and thus the network layer indicates which one or more stations are to be contacted by presenting MAC addresses at this interface.

As is shown in FIG. 1, with LANE the operation is exactly the same. That is, computers 102, 104, 106, and 108 continue to run some protocol designed to interface with standard Local Area Network protocols. When one of computers 102, 104, 106, or 108 desires to communicate to one or more other computers it hands a MAC address into the ATM protocol network emulation service interface 112 "as if" that interface were the service interface of a standard local area network protocol. Subsequently, the ATM protocol network emulation service interface 112 responds in the same way as the service interface of whatever LAN is being emulated. Thus, from the standpoint of applications programs running on attached computers 102, 104, 106, and 108, the fact that an emulation is present is completely transparent. Thus, such ATM protocol network emulation allows higher layer application protocols to continue to be utilized with no modification.

Where the unmodified applications end and the ATM protocol network emulation begins is illustrated in FIG. 1 by ATM protocol network emulation demarcation 110 (the dashed line separating computers 102, 104, 106, and 108 (running some LAN compatible protocol on the network layer) from the ATM protocol network emulation of a standard LAN service interface (e.g., the logical link control, and media access control layers of some standard local area network protocol)).

Figure 2:
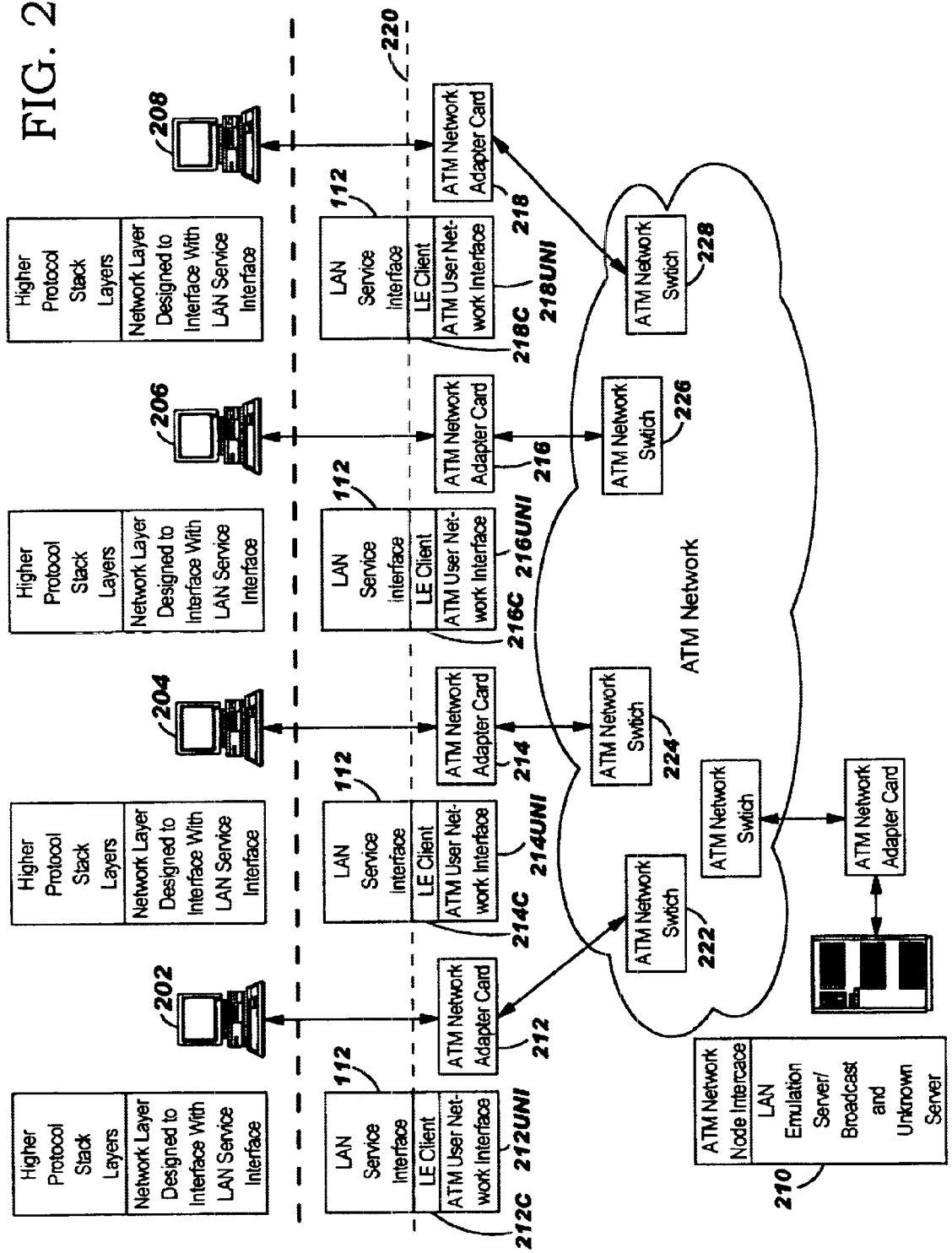
FIG. 2 gives a conceptual illustration of how the ATM protocol network provides Local Area Network emulation.

FIG. 2 gives an illustration of how ATM protocol provides Local Area Network Emulation. As will be shown in FIG. 2, ATM protocol provides Local Area Network Emulation by essentially doing two things: (1) slightly modifying the hardware and software of computing systems to be attached to an ATM network such that the computing systems can physically attach to and communicate with an ATM protocol network; and (2) providing hardware and software within the ATM protocol network itself which functions in conjunction with the modified attached computing systems to give rise to the appropriate emulation.

With respect to illustrating the modifications of the hardware of computing systems to be attached to the ATM network, shown are in FIG. 2 are computers 202, 204, 206, and 208 to which are connected to ATM Network Adapter Cards 212, 214, 216, and 218, which are in turn connected (usually via fiber optic links) to ATM Network Switches 222, 224, 226, and 228. Such modifications allow computers 202, 204, 206, and 208 to physically attach to an physically exchange signals with ATM Network Switches 222, 224, 226, and 228 which are actually part of the ATM protocol network proper.

With respect to illustrating the modifications of the software of computing systems to be attached to an ATM network, shown in FIG. 2 are computers 202, 204, 206, and 208 in which is illustrated the existence of ATM protocol network emulation service interface 112, which interfaces with LE Clients 212C, 214C, 216C, and 218C. LE Clients 212C, 214C, 216C, and 218C interface with ATM User Network Interfaces 212UNI, 214UNI, 216UNI, and 218UNI. ATM User Network Interfaces 212UNI, 214UNI, 216UNI, and 218UNI provide the mechanism by which LE Clients 212C, 214C, 216C, and 218C communicate by and through ATM Network Adapter Cards 212, 214, 216, and 218 with ATM Network Switches 222, 224, 226, and 228.

LE Clients 212C, 214C, 216C, and 218C are under the control of LES/BUS 210. Such LE Client under the control of LES/BUS 210 constitute an ELAN proper; accordingly, shown in FIG. 2 is line 220 demarking the boundary of the ELAN shown, which is composed of the LE Client 212C, 214C, 216C, and 218C under the control of LES/BUS 210.

When an application program running on computer 202 desires to communicate with another application running on another computer attached to ELAN 220, computer 202 specifies the MAC address of that other computer and passes it to ATM protocol network emulation service interface 112. Subsequently, ATM protocol network emulation service interface 112 passes the MAC address to LE Client 212C. LE Client 212C determines, from the received MAC address, what LAN function is to be emulated (e.g., that communication with a computer on the emulated LAN is to be established).

Subsequently, LE Client 212C via ATM protocol, queries LES 210 as to the ATM address of the device wherein the computer identified by the MAC address is located. This operation is known in the art as LAN Emulation Address Resolution Protocol (LE_ARP) Request.

In response to the LE_ARP Request, LES 210 consults its look up table (those in the art will recognize that a look up table is just one of the ways in which such could be accomplished) and responds with the ATM protocol network address wherein the LE Client associated with the MAC address resides. This operation is known in the art as LE_ARP Response.

Subsequent to receiving the ATM protocol address, LE Client 212 sets up a virtual channel connection to the destination LE Client associated with the MAC address, encapsulates the data utilizing appropriate ATM protocol, and sends it to the correct LE Client associated with the MAC address. The receiving LE Client, upon receipt of such data, then strips off the ATM protocol and delivers the data to the destination computer, through ATM protocol network emulation service interface 112, in standard local area network protocol format. Subsequent, ELAN communications proceed in much the same logical fashion. Thus, insofar as higher level applications running on computers 202, 204, 206, and 208 are concerned, they are connected into a standard service interface of a standard Local Area Network, and the fact that the underlying network is in fact an ATM protocol network is completely transparent, and hence of no consequence, to applications of computers 202, 204, 206, and 208 utilizing the emulated LAN.

As has been noted above, LANE protocol defines the operation of a single emulated LAN (ELAN). Such operation has been discussed broadly and conceptually in relation to FIGS. 1 and 2. Also as mentioned above, multiple ELANs may coexist simultaneously on a single ATM network since ATM connections do not "collide." The existence of such multiple ELANs will now be illustrated.

Figure 3B:
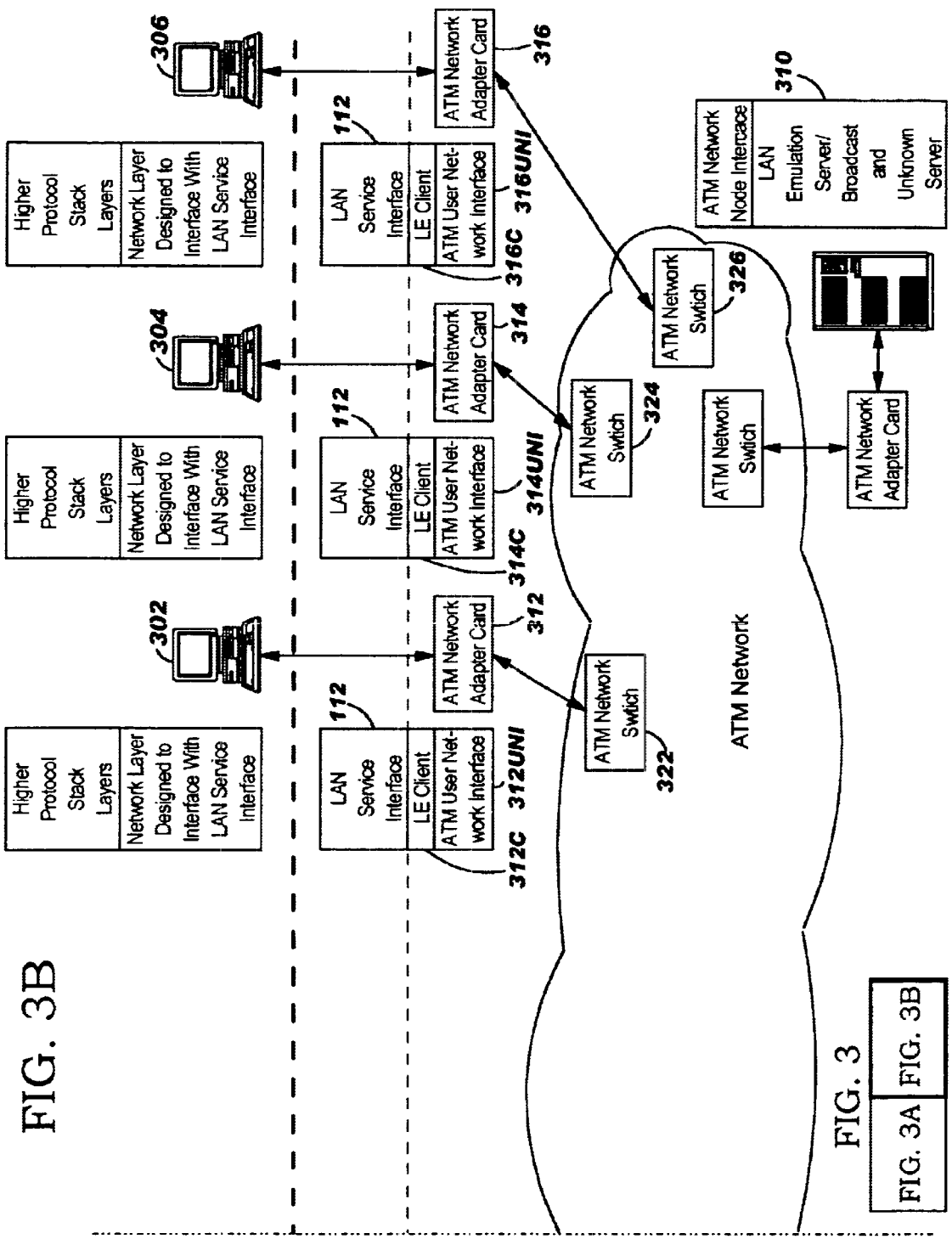
FIG. 3 illustrates a situation where two ELANs have been defined via the foregoing noted processes.

FIG. 3 illustrates a situation where two ELANs have been defined via the forgoing noted processes. Shown are a first ELAN and a second ELAN.

In FIG. 3, the first ELAN is composed of LE Clients 212C, 214C, and 216C, and is maintained and controlled by LES/BUS 210. The second ELAN is composed of LE Clients 312C, 314C, and 316C, and is maintained and controlled by LES 310. The first ELAN is utilized by computers 202, 204, and 206. The second ELAN is utilized by computers 302, 304, and 306 which are analogous in operation to computers 202, 204, and 206 as discussed previously in relation to FIGS. 1 and 2.

In operation, the first ELAN and the second ELAN shown in FIG. 3 operate in conceptually the same logical fashion as has been described in relation to the ELAN set forth and described in FIGS. 1 and 2. The question now naturally arises as to how to allow communication between stations attached to the two different ELANs. Such communication is generally referred to in the art as inter-elan communication.

The solution to the problem of inter-elan communication is generally dependent upon the type of network being emulated. The embodiments of the present invention set forth below are related to the emulation of Token Ring networks. ATM protocol Token Ring emulation provides functions of LAN Token Rings. Some of these functions are relevant to the discussing of the illustrative embodiments set forth below. Accordingly, following is a brief discussion of LAN Token Ring functions, and the ATM emulation of such functions, which are relevant to illustrative embodiments of the present invention presented below, after which illustrative embodiments of the present invention will be set forth.

In general, the following referenced figures and discussions of them will utilize one or more ELANs with components analogous to those discussed in FIGS. 1, 2, and 3. However, for sake of clarity not all components are illustrated in the following referenced figures, but those skilled in the art will understand that the following referenced figures are mean to convey that the requisite components analogous to those shown in FIGS. 1, 2, and 3 are present even when not explicitly shown.

Figure 4:
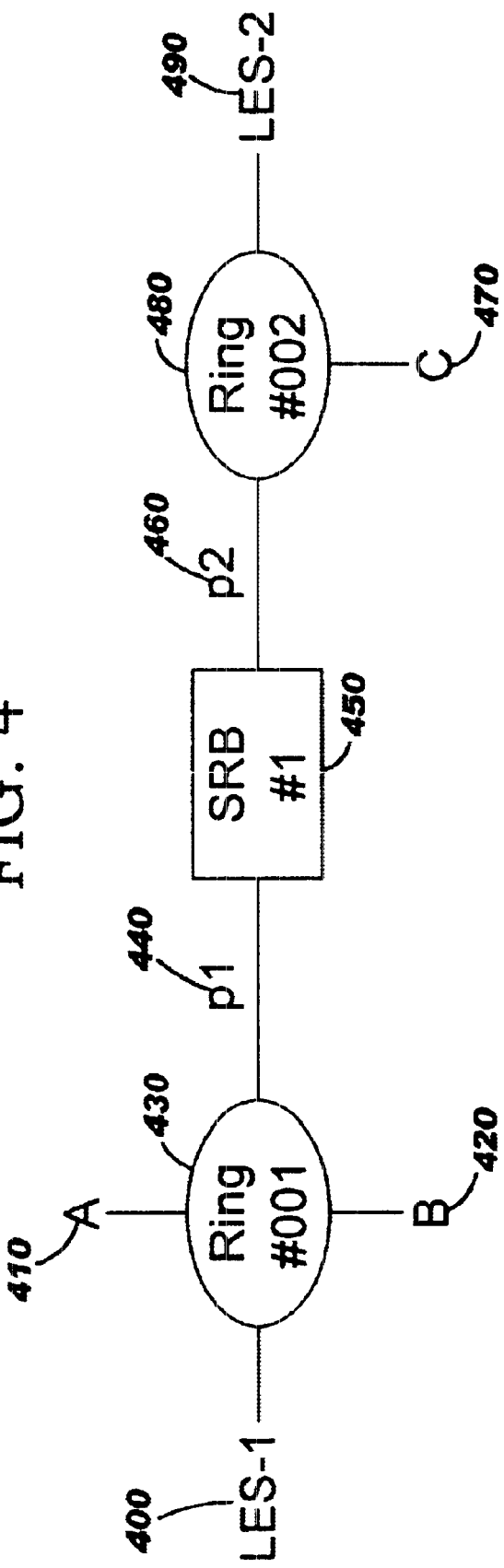
FIG. 4 is a partially schematic diagram that illustrates how the problem of inter-elan communication is generally solved when two or more Token-Ring ELANs are to communicate, and the problems that arise from such solution.

FIG. 4 is a partially schematic diagram that illustrates how the problem of inter-elan communication is generally solved when two or more Token-Ring ELANs are to communicate, and the problems that arise from such solution. Typically a LAN Source Route Bridge (a functional unit that is used to interface and provide bridging between different networks) is utilized to effectuate the inter-elan communication. FIG. 4 illustrates the typical use of such a LAN Source Route Bridge.

When Source Route Bridges (SRBs) are used to interconnect Token-Ring (TR) LANs together, each SRB is assigned a bridge number and each Token-Ring is assigned a unique ring number. Communications between 2 stations on the same Token-Ring involves no SRBs and packets are addressed to the destination station's MAC address. However, if the stations are on different Token-Rings (different ring #s), then the source station must find a path to the destination station. This path is called the Routing Information Field (RIF) and is a sequence of alternating ring numbers and bridge numbers that a packet must traverse to reach the destination MAC.

RIF discovery is normally done by stations on SRB networks by sending explorer frames to the destination. Each SRB that sees the explorer frame, adds its bridge # and the next ring # to the frame before forwarding it to the next ring. When the explorer arrives at the target station, it contains the RIF from the source to the target MAC.

Once a RIF has been discovered, each packet from the source to the destination must include the RIF in addition to the destination MAC. The SRBs in the network examine the RIF in each packet they see to determine if they should forward the packet.

All of the above applies to normal TRs as well as emulated TRs. In the case of emulated TRs, the LAN Emulation Client (LE Client) in the attached end-stations send different LE_ARPs to the LES based on whether the destination is on the same ring or a different ring. If the destination is on the same ring (indicated by an absence of a RIF in the packet), then the LE Client sends a LE_ARP_REQUEST to the LES with the destination MAC address. If the destination is on a different ring (indicated by a presence of a RIF in the packet), the LE Client sends a LE_ARP_REQUEST to the LES with the destination route-descriptor (RD). The destination RD is the next bridge # and ring # in the RIF. The destination MAC is not included in the LE_ARP_REQUEST in this case.

Stations A 410 and B 420 are on emulated Token-Ring #001 430. Station C 470 is on emulated Token-Ring #002 480. The two ELANS are inter-connected with a source-route bridge #1 450 (port p1 440 on Token-Ring #001 430, port p2 460 on Token-Ring #002 480). Each emulated Token-Ring is served by a LES/BUS (shown in FIG. 4 as LES-1 400 and LES-2 490).

Packets from Station A 410 to Station B 420 do not leave Token-Ring #001 430, so the LE Client in Station A 410 will send a LE_ARP_REQUEST to LES-1 400 to get the ATM address for Station B's 420 MAC address. LES-1 400 sends back a LE_ARP_RESPONSE with the ATM address of Station B 420. LE Client in Station A 410 sets up a direct connection to the LE Client in Station B 420 and starts sending packets.

Packets from Station A 410 to Station C 470 must leave the local ring. Station A 410 discovers that the RIF from Station A 410 to Station C 470 is 001 1 002 (i.e. ring 001, bridge 1, ring 002) using normal Token-Ring discovery as explained earlier. The LE Client in Station A 410 will send a LE_ARP_REQUEST to LES-1 400 to get the ATM address for route descriptor 1002 (i.e. bridge 1, ring 002). LES-1 400 sends back a LE_ARP_RESPONSE with the ATM address of p1 440 (SRB #1's 450 interface on Token-Ring #001 430). LE Client in Station A 410 sets up a connection to p1 440 and starts sending packets. Each packet contains the RIF from Station A 410 to Station C 470 (ring 001, bridge 1, ring 002). The LE Client in p1 440 receives the packet, strips the ATM headers and passes the packet to SRB #1 450. SRB #1 450 examines the RIF and forwards the packets to p2 460 for transmission to Token-Ring #002 480. The LE Client in p2 460 examines the RIF and realizes that Token-Ring #002 480 is the last ring (so target MAC is on local ring). P2 460 sends a LE_ARP_REQUEST to LES-2 490 to get the ATM address for Station C's 470 MAC address. LES-2 490 sends back a LE_ARP_RESPONSE with the ATM address of Station C 470. LE Client in p2 460 sets up a direct connection to LE Client in Station C 470 and starts sending packets.

The present invention attempts to increase communications efficiency by bypassing one or more intermediate SRBs and allowing a direct connection to be setup between the end-stations. Two different illustrative embodiments to achieve the foregoing are set forth below in FIGS. 5 and 6.

Figure 5:
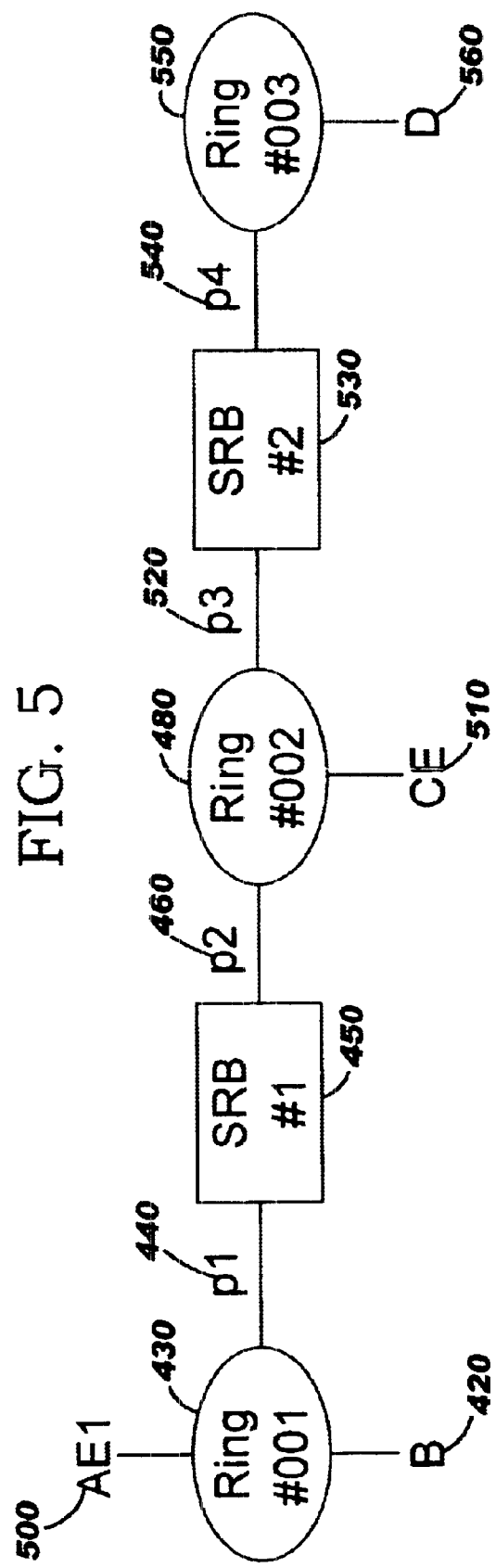
FIG. 5 is a partially schematic diagram that illustrates a first illustrative embodiment which can be referred to as ATM address advertisement.

FIG. 5 is a partially schematic diagram that illustrates a first illustrative embodiment which can be referred to as ATM address advertisement.

This illustrative embodiment requires enhancements to the SRBs and the LE Clients that attach to the Token-Ring ELANS. The enhanced SRBs periodically advertise the 3-tuple <Bridge#, Ring#, ATM address of the outgoing port> for each ring the SRB connects to. The enhanced LE Clients may also periodically advertise the 3-tuple <MAC address, Ring# of the ELAN that the LE Client is connected to, ATM address of the outgoing port>. Furthermore, the enhanced LE Clients cache the information learned from other's advertisements. When sending a packet to a destination on the local ring (indicated by an absence of a RIF in the packet), the enhanced LE Client behaves like a normal LE Client. When sending a packet to a destination on a different ring (indicated by the presence of a RIF in the packet), the enhanced LE Client consults its cache. If it finds the destination MAC/Ring in its cache, it will setup a direction connection to the ATM address of the destination, thus bypassing intermediate SRBs. If the destination MAC/Ring is not in the cache, the enhanced LE Client will search its cache for the last RD (bridge#, ring#) in the RIF. It will work back from the end of the RIF until it finds a RD match in its cache. If a match is found, the LE Client will setup a connection to the ATM address that corresponds to the RD. If none of the RDs are in the cache, the enhanced LE Client will work like a normal LE Client and send a LE_ARP_REQUEST to its LES with the first RD in the RIF.

With respect to FIG. 5, Stations AE1 500 and B 420 are on emulated Token-Ring #001 430, Station CE 510 is on emulated Token-Ring #002 480 and station D 560 is on emulated Token-Ring #003 550. Token-Rings #001 430 and #002 480 are inter-connected with SRB#1 450 via ports p1 440 and p2 460.

Token-Rings #002 480 and #003 550 are inter-connected with SRBE #2 530 via ports p3 520 and p4 540. Each emulated Token-Ring is served by a LES/BUS which is not shown. Station AE1 500 and Station CE 510 contain enhanced LE Clients, while Station B 420 and Station D 560 contain normal LE Clients. SRBE #2 530 is an enhanced SRB and SRB #1 450 is a regular SRB.

SRBE #2 530, on Token-Ring #003 550, advertises the 3-tuple <Bridge 2, Ring 002, ATM address of p4> and, on Token-Ring #002 480, advertises the 3-tuple <Bridge 2, Ring 003, ATM address of p3>. Station AE1 500 advertises <MAC address of Station AE1, Ring 001, ATM address of Station AE1>. Similarly Station CE 510 advertises <MAC address of Station CE, Ring 002, ATM address of Station CE>.

Packets from Station AE1 500 to Station B 420 do not leave Token-Ring #001 430, so the LE Client in Station AE1 500 behaves like a normal LE Client as explained above.

Packets from Station AE1 500 to Station CE 510 must leave the local ring. Station AE1 500 discovers that the RIF from Station AE1 500 to Station CE 510 is 001 1 002 (i.e. ring 001, bridge 1, ring 002) using normal Token-Ring discovery as explained earlier. The enhanced LE Client in Station AE1 500 will search its cache and find <MAC address of Station CE, Ring 002, ATM address of Station CE> so it will setup a connection to Station CE 510 and start sending packets to Station CE 510, thus bypassing SRB #1 450.

Packets from Station AE1 500 to Station D 560 must also leave the local ring. Station AE1 500 discovers that the RIF from Station AE1 500 to Station D 560 is 001 1 002 2 003 (i.e. ring 001, bridge 1, ring 002, bridge 2, ring 003) using normal Token-Ring discovery as explained earlier. The enhanced LE Client in Station AE1 500 will search its cache but not find <MAC address of Station D, ring 003, ATM address of Station D> so it will search for and in this case find the last RD <bridge 2, ring 003, ATM address of p3>. The enhanced LE Client in Station AE1 500 will setup a connection to p3 520 and start sending packets. In this case, SRB #1 450 is bypassed but SRBE #2 530 is not.

Figure 6:
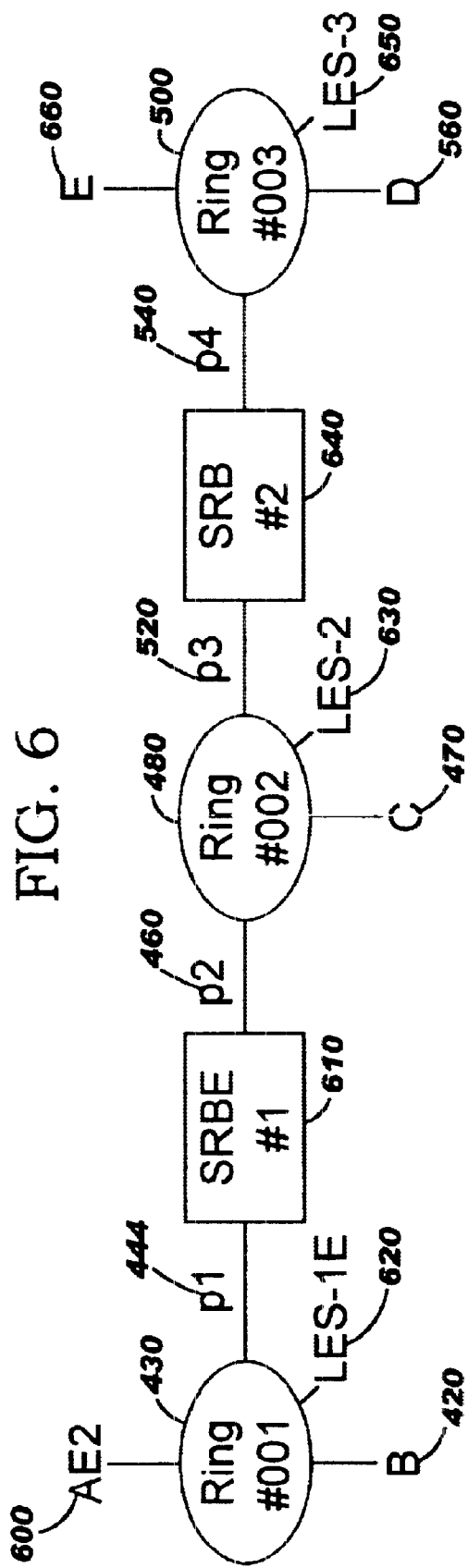
FIG. 6 is a partially schematic diagram that illustrates a second illustrative embodiment which can be referred to as dynamic ATM address discovery.

FIG. 6 is a partially schematic diagram that illustrates a second illustrative embodiment which can be referred to as dynamic ATM address discovery.

This illustrative embodiment minimizes changes and cache requirements in the end-station LE Clients and eliminates network traffic for advertisements.

This illustrative embodiment requires enhancements to the LE Clients that attach to the Token-Ring ELANS, the LESs that serve the ELANs as well as the SRBs that inter-connect the ELANs.

The changes to LE Clients are minor. The enhanced LE Clients behave like normal LE Clients except that they put additional information in a Type-Length-Value (TLV) field when sending LE_ARP_REQUESTs for RDs to the LES. The additional information sent in this enhanced LE_ARP_REQUEST is the RIF and destination MAC. The enhanced LE Client may receive an enhanced LE_ARP_RESPONSE containing additional information in a TLV. This additional information is the original TLV containing the RIF/MAC and an indication of how far into the RIF/MAC a short-cut connection can be established. This indication could simply be a counter that indicates the number of ELANs in the RIF for which a short-cut can be established. The enhanced LE Client must cache the information in the enhanced LE_ARP_RESPONSE and use it for subsequent transmissions to the RIF/MAC. As an optimization, the enhanced LE Client could use an existing partial short-cut connection, for traffic destined to other RIFs or MACs that share the first part of the RIF.

If an enhanced LE Client does not receive a LE_ARP_RESPONSE for an enhanced LE_ARP_REQUEST, it should send a normal LE_ARP_REQUEST (i.e. without a TLV containing the RIF/MAC).

The LES is enhanced to handle the enhanced LE_ARP_REQUEST. The enhanced LES forwards the enhanced LE_ARP_REQUEST to all proxy LE Clients (SRBs). The enhanced LES also receives enhanced LE_ARP_RESPONSES from enhanced SRBs and forwards them to the requesting enhanced LE Clients.

The enhanced SRBs receive enhanced LE_ARP_REQUESTs from enhanced LESs and forward them to other ELANs based on the RIF/MAC in the TLV of the enhanced LE_ARP_REQUEST. Each enhanced SRB modifies the destination in the enhanced LE_ARP_REQUEST to be the next RD or the destination MAC before forwarding the enhanced LE_ARP_REQUEST on an ELAN. When a LE_ARP_13 RESPONSE to a forwarded enhanced LE_ARP_REQUEST is received, the enhanced SRB sets the TLV in the LE_ARP_RESPONSE and forwards it back to the originating LAN. The TLV in the LE_ARP_RESPONSE is set as follows:

```
If the LE_ARP_RESPONSE is an enhanced LE_ARP_RESPONSE
    then
        no change is made to the TLV
    else // LE_ARP_RESPONSE does not contain a TLV
        If the LE_ARP_REQUEST was for a MAC,
            then
                Set the TLV to
                the original TLV
                in the enhanced
                LE_ARP_REQUEST and
                indicate that a
                shortcut to the
                MAC can be
                established
            else // LE_ARP_REQUEST was for a RD
                Set the TLV to
                the original TLV
                in the enhanced
                LE_ARP_REQUEST and
                indicate that a
                shortcut can be
                set up to the
                next RD
```

With reference to FIG. 6, Stations AE2 600 and B 420 are on emulated Token-Ring #001 430, Station C 470 is on emulated Token-Ring #002 480 and Stations D 560 and E 660 are on emulated Token-Ring #003 550. Token-Rings #001 430 and #002 480 are inter-connected with SRBE #1 610 via ports p1 444 and p2 460. Token-Rings #002 480 and #003 550 are inter-connected with SRB #2 640 via ports p3 520 and p4 540. Station AE2 600 contains an enhanced LE Client, while Station B 420, Station C 470, Station D 560, and Station E 660 contain normal LE Clients. SRBE #1 610 is an enhanced SRB and SRB #2 640 is a regular SRB. LES-1E 620 is an enhanced LES/BUS, while LES-2 630 and LES-3 650 are regular LES/BUSs.

Packets from Station AE2 600 to Station B 420 do not leave Token-Ring #001 430, so the LE Client in Station AE2 600 behaves like a normal LE Client as explained above.

Packets from Station AE2 600 to Station C 470 must leave the local ring. Station AE2 600 discovers that the RIF from Station AE2 600 to Station C 470 is 001 1 002 (i.e. ring 001, bridge 2, ring 002) using normal Token-Ring discovery as explained earlier. The enhanced LE Client in Station AE2 600 will send an enhanced LE_ARP_REQUEST to the LES-1E 620 with the next RD (1 002). The entire RIF (001 1 002) and destination MAC of Station C 470 is included in a TLV. The enhanced LES-1E 620 will realize that the LE_ARP_REQUEST is enhanced and will forward it to all proxy LE Clients including SRBE #1 610. SRBE #1 610 is the last bridge in the RIF, so it changes the enhanced LE_ARP_REQUEST to a normal LE_ARP_REQUEST with the destination set to the MAC address of Station C 470 and forwards it to LES-2 630. LES-2 630 sends a LES_ARP_RESPONSE with the ATM address of Station C 470. SRBE #1 610 realizes that this LE_ARP_RESPONSE is for a forwarded enhanced LE_ARP_REQUEST, so it changes the LE_ARP_RESPONSE to an enhanced LE_ARP_RESPONSE by adding the original TLV, with an indication that a short-cut can be set up to the destination MAC, and forwards it to Token-Ring #001 430. LES-1E 620 receives the enhanced LE_ARP_RESPONSE and forwards it back to Station AE2 600. The LE Client in Station AE2 600 caches the TLV and the associated ATM address (RIF: 001 1 002, MAC: C ATM:C) and sets up a connection to Station C 470. When the LE Client in Station AE2 600 sees subsequent packets addressed to Station C 470 using this RIF, it will find the connection in its cache and use it, thus bypassing SRBE #1 610. Note, in this example, since Station C 470 doesn't contain an enhanced LE Client, it sends packets to Station AE2 600 in the standard way via SRBE #1 610.

Packets from Station AE2 600 to Station D 560 must also leave the local ring. Station AE2 600 discovers that the RIF from Station AE2 600 to Station D 560 is 001 1 002 2 003 (i.e. ring 001, bridge 1, ring 002, bridge 2, ring 003) using normal Token-Ring discovery as explained earlier. The enhanced LE Client in Station AE2 600 will send an enhanced LE_ARP_REQUEST to LES-1E 620 with the next RD (1 002). The entire RIF (001 1 002 2 003) and destination MAC of Station D 560 is also included in a TLV. The enhanced LES-1E 620 will realize that the LE_ARP_REQUEST is enhanced and will forward it to all proxy LE Clients including SRBE #1 610. SRBE #1 610 is not the last bridge in the RIF, so it changes the destination in the enhanced LE_ARP_REQUEST to the next RD (2 003) and forwards it to LES-2 630. Since LES-2 630 is not enhanced, it ignores the TLV and sends a LE_ARP_RESPONSE with the ATM address of p3 520. (Note: A non-enhanced LES may discard LE_ARP_REQUESTS with special TLVs, in which case the sending LE Client will re-try with a normal LE_ARP_REQUEST.) SRBE #1 610 realizes that this LE_ARP_RESPONSE is for a forwarded enhanced LE_ARP_REQUEST, so it changes the LE_ARP_RESPONSE to an enhanced LE_ARP_RESPONSE and sets the RIF/MAC in the TLV and an indication that a short cut can be established up to SRB #2 640. SRBE #1 610 forwards the enhanced LE_ARP_RESPONSE to Token-Ring #001 430. LES-1E 620 receives the enhanced LE_ARP_RESPONSE and forwards it back to Station AE2 600. The LE Client in Station AE2 600 caches the TLV and the ATM address associated with it and sets up a connection to p3 520. When the LE Client in Station AE2 600 sees subsequent packets addressed to this RIF/MAC, it will find this connection in its cache and will use it, thus bypassing SRBE #1 620.

If Station AE2 600 sends packets to Station E 660 using RIF 001 1 002 2 003, the LE Client in Station AE2 600 can be optimized to use the connection for Station D 560 (since the RIF is the same) instead of sending out another enhanced LE_ARP_REQUEST.

Figure 7:
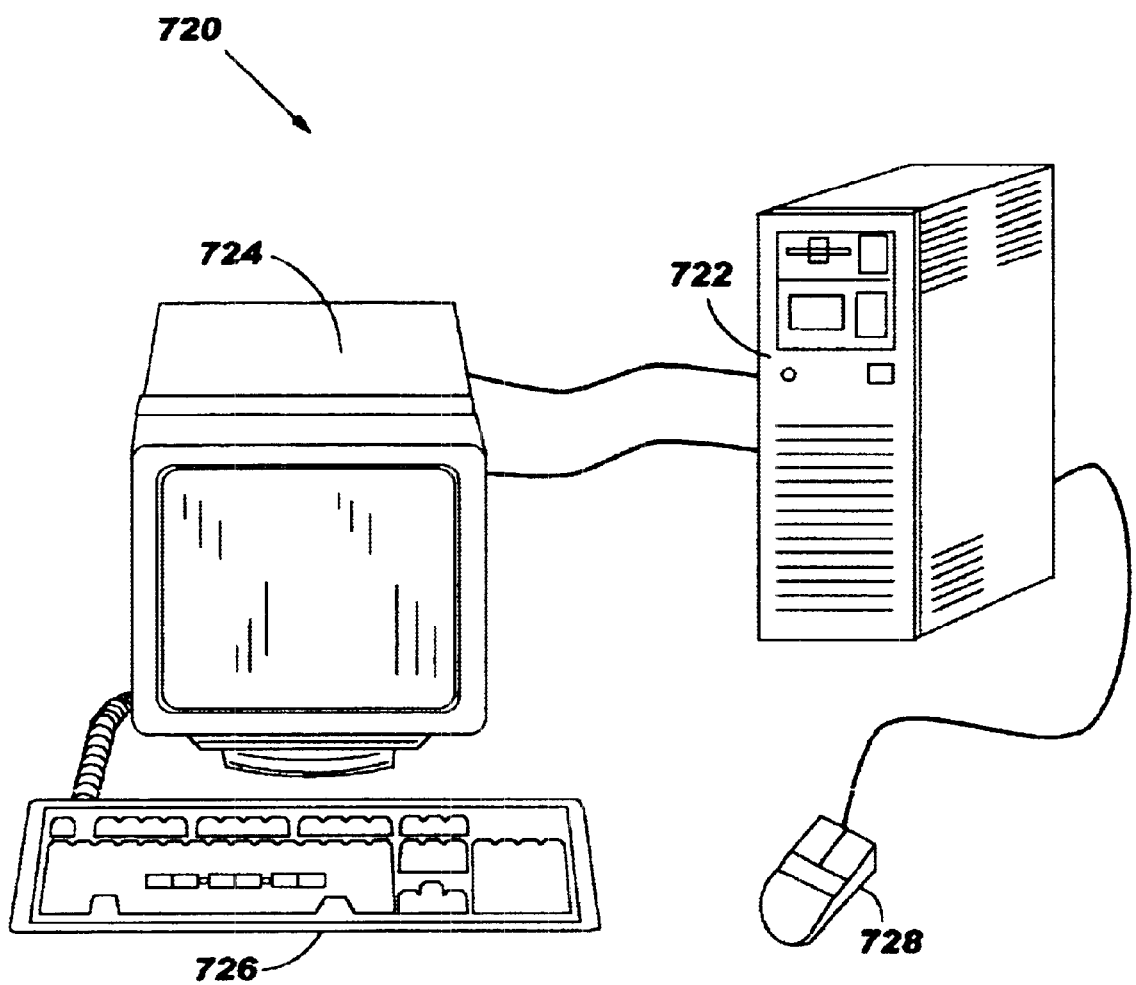
FIG. 7 depicts a pictorial representation of a data-processing system which can be utilized in accordance with the method and system of an illustrative embodiment of the present invention.

With reference now to the figures and in particular with reference now to FIG. 7, there is depicted a pictorial representation of a data-processing system which can be utilized in accordance with the method and system of an illustrative embodiment of the present invention. Those skilled in the art will recognize that while the foregoing figures have illustrated the method and systems of illustrative embodiments of the present invention as modules running on computers, or data processing systems, such methods and systems could just as easily be implemented in hardware, software, firmware or a combination of such. Also, as will be recognized by those skilled within the art, such data processing systems can be referred to alternatively by the following (non-exclusive) terms: computers, computing systems, routers or switches. The method and system provided by an illustrative embodiment of the present invention can be implemented with the data-processing system depicted in FIG. 7. A computer 720 is depicted which includes a system unit 722, a video display terminal 724, a keyboard 726, and a mouse 728. Computer 720 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

FIG. 8 is an illustration of a representative hardware environment which can be utilized in accordance with the method and system of an illustrative embodiment of the present invention. FIG. 8 depicts selected components in computer 720 in which an illustrative embodiment of the present invention may be implemented. System unit 722 includes a Central Processing Unit ("CPU") 831, such as a conventional microprocessor, and a number of other units interconnected via system bus 832. Computer 720 includes random-access memory ("RAM") 834, read-only memory ("ROM") 836, display adapter 837 for connecting system bus 832 to video display terminal 724, and I/O adapter 839 for connecting peripheral devices (e.g., disk and tape drives 833) to system bus 832. Video display terminal 724 is the visual output of computer 720, which can be a CRT-based video display well-known in the art of computer hardware. However, with a portable or notebook-based computer, video display terminal 724 can be replaced with an LCD-based or a gas plasma-based flat-panel display. Computer 720 further includes user interface adapter 840 for connecting keyboard 726, mouse 728, speaker 846, microphone 848, and/or other user interface devices, such as a touch screen device (not shown), to system bus 832. Communications adapter 849 connects computer 720 to a data-processing network.

Any suitable machine-readable media may retain the method and system of an illustrative embodiment of the present invention, such as RAM 834, ROM 836, a magnetic diskette, magnetic tape, or optical disk (the last three being located in disk and tape drives 833). Any suitable operating system and associated graphical user interface (e.g., Microsoft Windows) may direct CPU 831. For example, the AIX operating system and AIXwindows windowing system (i.e., graphical user interface) can direct CPU 831. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 831, such as touch-screen technology or human voice control. In addition, computer 720 includes a control program 851 which resides within computer storage 850. Control program 851 contains instructions that when executed on CPU 831 carries out the operations depicted and/or contained in any or all of the partially schematic diagrams of FIGS. 5, and 6 and the discussion accompanying the figures, as described herein.

Those skilled in the art will appreciate that the hardware depicted in FIG. 7 and FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for achieving enhanced performance in communications between a plurality of emulated networks overlaid onto at least one base network, wherein said communications involve one or more source route bridges, said method comprising the steps of:

determining when communication is to occur, through said one or more source route bridges, and between at least two entities where a first of said at least two entities is a member of a first emulated network and where a second of said at least two entities is a member of another of said plurality of emulated networks;

communicating to said first entity, one or more base network addresses that identify the location of an entity closely correspodent to said second entity in said at least one base network; and thereafter utilizing said one or more base network addresses instead of emulated network addresses in communication between said first and second entities such that communications between said first and second entities is established and such that at least one of said one or more source route bridges is bypassed and such that the processing and delay associated with said at least one bypassed source route bridge is avoided wherein said performance in communications involving said at least two emulated networks is enhanced.

2. The method of claim 1, wherein said step of determining further comprises the steps of:

examining header information on a data packet received by said first of said at least two entities; and in response to said examination, determining whether said data packet is destined for said second of said at least two entities.

3. The method of claim 1, wherein said step of communicating further comprises the steps of:

in response to said determining step indicating communication is to occur, directing at least one of said at least two entities to query an emulation server as to a communications shortcut which bypasses at least one of said one or more source route bridges; and in response to said directed query, communicating to said at least one of said at least two entities at least one base network address, that identifies the location of said at least one of said at least two entities in said at least one base network, which will allow bypass of at least one of said one or more source route bridges.

4. The method of claim 1, wherein said step of communicating further comprises the steps of:

broadcasting, on a scheduled or opportunistic basis, said at least one source route bridge's bridge identification, base network address, and the emulated networks which said at least one source route bridge connect;

in response to said broadcasting step, storing said broadcasted information within at least one entity that is a member of at least one of said plurality of emulated networks.

5. The method of claim 1, wherein said step of communicating further comprises the steps of:
defining a set whose members include one or more entities which are members of at least one of said plurality of emulated networks;
broadcasting, on a scheduled or opportunistic basis, emulated network addresses and correspondent one or more base network addresses of said defined set members; and
in response to said broadcasting step, storing said broadcasted information within at least one entity that is a member of at least one of said plurality of emulated networks.

6. The method of claim 1, wherein said step of thereafter utilizing further comprises the step of utilizing said one or more base network addresses to establish one or more direct base network communication links between the base network communications entities most closely correspondent to said at least two entities.

7. The method of claim 3, further comprising the step of, in response to said communicating step, storing within said first entity, said communicated at least one base network address, that identify the location of said second entity in said at least one base network, which will allow bypass of at least one of said one or more source route bridges.

8. An apparatus for achieving enhanced performance in communications between a plurality of emulated networks overlaid onto at least one base network, wherein said communications involve one or more source route bridges, and said apparatus comprising:
means for determining when communication is to occur, through said one or more source route bridges, and between at least two entities where a first of said at least two entities is a member of a first emulated network and where a second of said at least two entities is a member of another of said plurality of emulated networks;
means for communicating to said first entity, one or more base network addresses that identify the location of an entity closely correspondent to said second entity in said at least one base network; and
means for thereafter utilizing said one or more base network addresses instead of emulated network addresses in communication between said first and second entities such that communications between said first and second entities is established and such that at least one of said one or more source route bridges is bypassed and such that the processing and delay associated with said at least one bypassed source route bridge is avoided wherein said performance in communications involving said at least two emulated networks is enhanced.

9. The apparatus of claim 8, wherein said means for determining further comprises:
means for examining header information on a data packet received by said first of said at least two entities; and
means, responsive to said examination, for determining whether said data packet is destined for said second of said at least two entities.

10. The apparatus of claim 8, wherein said means for communicating further comprises:
means, responsive to said determining step indicating communication is to occur, for directing at least one of said at least two entities to query an emulation server as to a communications shortcut which bypasses at least one of said one or more source route bridges; and
means, responsive to said means for directing, for communicating to said at least one of said at least two entities at least one base network address, that identifies the location of at least one other of said at least two entities in said at least one base network, which will allow bypass of at least one of said one or more source route bridges.

11. The apparatus of claim 8, wherein said means for communicating further comprises:
means for broadcasting, on a scheduled or opportunistic basis, said at least one source route bridge's bridge identification, base network address, and the emulated networks which said at least one source route bridge connect;
means, responsive to said means for broadcasting, for storing said broadcasted information within at least one entity that is a member of at least one of said plurality of emulated networks.

12. The apparatus of claim 8, wherein said means for communicating further comprises:
means for defining a set whose members include one or more entities which are members of at least one of said plurality of emulated networks;
means for broadcasting, on a scheduled or opportunistic basis, emulated network addresses and correspondent one or more base network addresses of said defined set members; and
means, responsive to said means for broadcasting, for storing said broadcasted information within at least one entity that is a member of at least one of said plurality of emulated networks.

13. The apparatus of claim 8, wherein said means for thereafter utilizing further comprises means for utilizing said one or more base network addresses that identify the location of said second entity in said at least one base network to establish one or more direct base network communication links between the base network communications entities most closely correspondent to said at least two entities.

14. The apparatus of claim 10, further comprising means, responsive to said means for communicating, for storing within said first entity, said communicated at least one base network address, that identify the location of said second entity in said at least one base network, which will allow bypass of at least one of said one or more source route bridges.

15. A program product for achieving enhanced performance in communications between a plurality of emulated networks overlaid onto at least one base network, wherein said communications involve one or more source route bridges, said program product comprising:
means for determining when communication is to occur, through said one or more source route bridges, and between at least two entities where a first of said at least two entities is a member of a first emulated network and where a second of said at least two entities is a member of another of said plurality of emulated networks;
means for communicating to said first entity, one or more base network addresses that identify the location of said an entity closely correspondent to said second entity in said at least one base network;
means for thereafter utilizing said one or more base network addresses instead of emulated network addresses in communication between said first and second entities such that communications between said first and second entities is established and such that at least one of said one or more source route bridges is bypassed and such that the processing and delay associated with said at least one bypassed source route bridge is avoided wherein said performance in communications involving said at least two emulated networks is enhanced; and signal bearing media bearing said means for determining, said means for communicating, and said means for thereafter utilizing.

16. The program product of claim 15, wherein said signal bearing means further comprises transmission media.

17. The program product of claim 15, wherein said signal bearing means further comprises recordable media.

18. The program product of claim 15, wherein said means for determining further comprises:

means for examining header information on a data packet received by said first of said at least two entities; and means, responsive to said examination, for determining whether said data packet is destined for said second of said at least two entities.

19. The program product of claim 15, wherein said means for communicating further comprises:

means, responsive to said means for determining indicating communication is to occur, for directing at least one of said at least two entities to query an emulation server as to a communications shortcut which bypasses at least one of said one or more source route bridges; and means, responsive to said means for directing, for communicating to said at least one of said at least two entities at least one base network address, allowing bypass of at least one of said one or more source route bridges.

20. The program product of claim 15, wherein said means for communicating further comprises:

means for broadcasting, on a scheduled or opportunistic basis, said at least one source route bridge's bridge identification, base network address, and the emulated networks which said at least one source route bridge connect;

means, responsive to said means for broadcasting, for storing said broadcasted information within at least one entity that is a member of at least one of said plurality of emulated networks.

21. The program product of claim 15, wherein said means for communicating further comprises:

means for defining a set whose members include one or more entities which are members of at least one of said plurality of emulated networks;

means for broadcasting, on a scheduled or opportunistic basis, emulated network addresses and correspondent one or more base network addresses of said defined set members; and means, responsive to said means for broadcasting, for storing said broadcasted information within at least one entity that is a member of at least one of said plurality of emulated networks.

22. The program product of claim 15, wherein said means for thereafter utilizing further comprises means for utilizing said one or more base network addresses to establish one or more direct base network communication links between the base network communications entities most closely correspondent to said at least two entities.

23. The program product of claim 19, further comprising means, responsive to said means for communicating, for storing within at least one of said at least two entities said communicated at least one address, allowing bypass of at least one of said one or more source route bridges.

* * * * *